US012775186B2

(12) United States Patent
Kim et al.

(10) Patent No.: US 12,775,186 B2
(45) Date of Patent: Oct. 27, 2026

(54) OPTICAL DEVICE

(71) Applicant: LG Chem, Ltd., Seoul (KR)

(72) Inventors: Jung Woon Kim, Daejeon (KR); Jung Sun You, Daejeon (KR); Doo Young Huh, Daejeon (KR); Beom Jin Lee, Daejeon (KR); Dong Hyun Oh, Daejeon (KR); Jin Hong Kim, Daejeon (KR); Min Jun Gim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 33 days.

(21) Appl. No.: 18/851,439

(22) PCT Filed: Mar. 30, 2023

(86) PCT No.: PCT/KR2023/004292

§ 371 (c)(1),
(2) Date: Sep. 26, 2024

(87) PCT Pub. No.: WO2023/191547

PCT Pub. Date: Oct. 5, 2023

(65) Prior Publication Data

US 2025/0224638 A1 Jul. 10, 2025

(30) Foreign Application Priority Data

Mar. 30, 2022 (KR) ........................ 10-2022-0039633

(51) Int. Cl.
*G02F 1/1339* (2006.01)
*B60J 3/04* (2006.01)
(Continued)

(52) U.S. Cl.
CPC ...... *G02F 1/1339* (2013.01); *G02F 1/133302* (2021.01); *G02F 1/133536* (2013.01); *B60J 3/04* (2013.01); *G02F 2202/28* (2013.01)

(58) Field of Classification Search
CPC ............... G02F 1/339; G02F 1/133302; G02F 1/133536; G02F 2202/28; B60J 3/04
See application file for complete search history.

(56) References Cited

U.S. PATENT DOCUMENTS

| | | | | |
|---|---|---|---|---|
| 2004/0209007 A1* | 10/2004 | Satake | G02B 1/16 | 428/1.3 |
| 2005/0002081 A1* | 1/2005 | Beteille | B32B 17/10293 | 359/275 |

(Continued)

FOREIGN PATENT DOCUMENTS

| | | |
|---|---|---|
| JP | 2017181869 A | 10/2017 |
| JP | 2018141890 A | 9/2018 |

(Continued)

OTHER PUBLICATIONS

PE2E English translation of JP2021172532A (Year: 2021).*
(Continued)

*Primary Examiner* — David Y Chung
(74) *Attorney, Agent, or Firm* — Lerner David LLP

(57) ABSTRACT

The present application relates to an optical device, comprising: a first outer substrate; a liquid crystal cell and a second outer substrate sequentially, wherein the liquid crystal cell comprises an upper substrate including a first base layer and a pressure-sensitive adhesive layer; a lower substrate including a second base layer and spacers; and a liquid crystal layer including a liquid crystal compound between the upper substrate and the lower substrate, and the optical device further comprises: a first intermediate layer between the first outer substrate and the liquid crystal cell, and a second intermediate layer between the second outer substrate and the liquid crystal cell, wherein the optical device of the present application can properly maintain a cell gap of a liquid crystal cell, have excellent adhesion between an upper substrate and a lower substrate, and solve the pressing
(Continued)

and overflow phenomena of the liquid crystal cell during bonding with an outer substrate.

16 Claims, 2 Drawing Sheets

(51) Int. Cl.

| | |
|---|---|
| ***G02F 1/1333*** | (2006.01) |
| ***G02F 1/1335*** | (2006.01) |

(56) References Cited

U.S. PATENT DOCUMENTS

| | | | |
|---|---|---|---|
| 2005/0068629 | A1 | 3/2005 | Fernando et al. |
| 2014/0152945 | A1 | 6/2014 | Watanabe et al. |
| 2017/0291537 | A1 | 10/2017 | Frey et al. |
| 2018/0188869 | A1 | 7/2018 | Boggs et al. |
| 2019/0162991 | A1 | 5/2019 | Hagiwara |
| 2020/0319504 | A1 | 10/2020 | Kim et al. |
| 2022/0105710 | A1 | 4/2022 | Ishii et al. |
| 2022/0146878 | A1 | 5/2022 | Lee et al. |
| 2022/0350185 | A1* | 11/2022 | Gim .......................... E06B 9/24 |
| 2023/0229050 | A1 | 7/2023 | Kim et al. |

FOREIGN PATENT DOCUMENTS

| | | | | | |
|---|---|---|---|---|---|
| JP | 202030355 | A | | 2/2020 | |
| JP | 2020118903 | A | | 8/2020 | |
| JP | 2021172532 | A | * | 11/2021 | |
| KR | 20060087600 | A | | 8/2006 | |
| KR | 20190008183 | A | | 1/2019 | |
| KR | 20190058666 | A | | 5/2019 | |
| KR | 20190074996 | A | | 6/2019 | |
| KR | 20210038132 | A | | 4/2021 | |
| KR | 20220006830 | A | | 1/2022 | |
| KR | 20220007333 | A | | 1/2022 | |
| TW | 202102881 | A | | 1/2021 | |
| TW | 202206916 | A | | 2/2022 | |
| WO | WO-2021071263 | A1 | * | 4/2021 | ......... G02F 1/13394 |

OTHER PUBLICATIONS

Extended European Search Report including Written Opinion for Application No. 23781398.5 dated Jun. 30, 2025, pp. 1-11.

Jang, S. et al., "P-120: Tight Bonding of Two Plastic Substrates for Flexible LCDs," SID Symposium Digest of Technical Papers, Jul. 2012, vol. 38, Issue 1, p. 653-656. [Providing English Translation of Abstract only].

International Search Report for PCT/KR2023/004292 mailed Jul. 5, 2023. 5 pages.

* cited by examiner

[Figure 1]
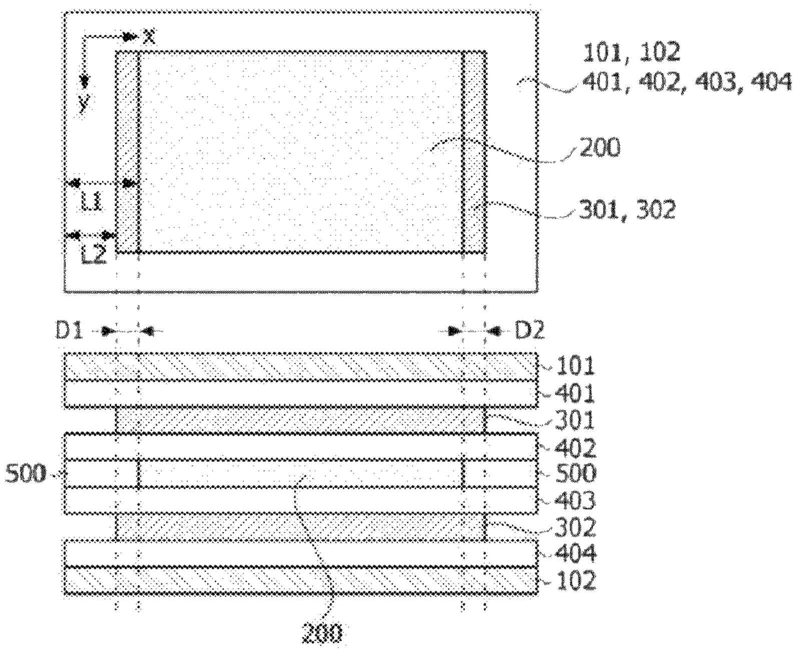
[Figure 2]
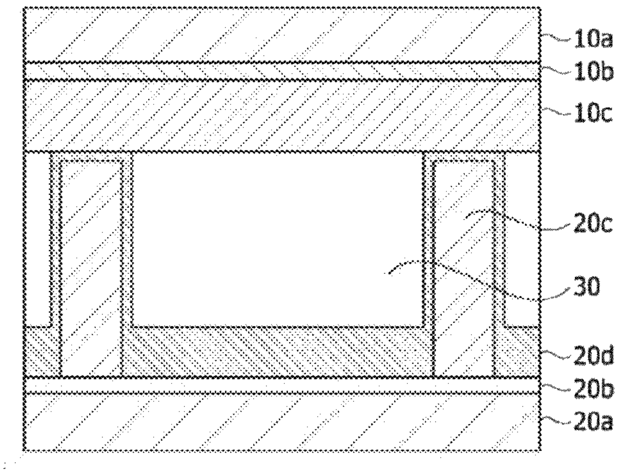

[Figure 3]
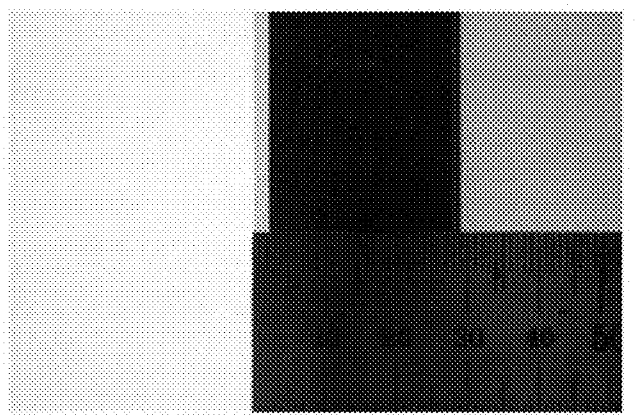
[Figure 4]
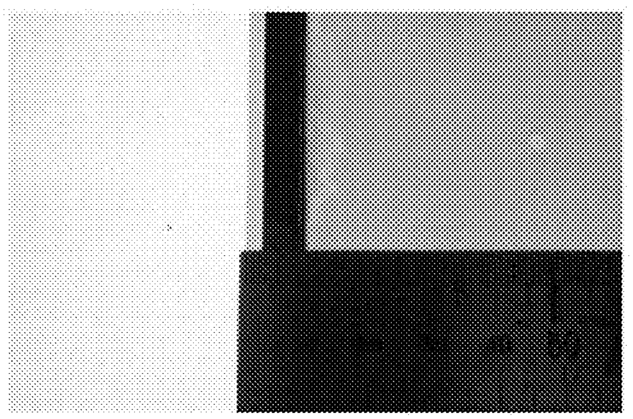

OPTICAL DEVICE

CROSS-REFERENCE TO RELATED APPLICATIONS

The present application is a national phase entry under 35 U.S.C. § 371 of International Application No. PCT/KR2023/004292 filed on Mar. 30, 2023, which claims priority from Korean Patent Application No. 10-2022-0039633, filed on Mar. 30, 2022, the disclosures of which are incorporated herein by reference in their entireties.

TECHNICAL FIELD

The present application relates to an optical device.

BACKGROUND ART

For long-term stability and large-area scalability of a liquid crystal film cell using flexible substrates, it is important that a cell gap is maintained between upper and lower substrates and adhesion force is imparted between the upper and lower substrates.

In Non-Patent Document 1, ("Tight Bonding of Two Plastic Substrates for Flexible LCDs" SID Symposium Digest, 38, pp. 653-656 (2007)), a technique for forming an organic film pattern in the form of a column or wall with a cell gap height on one substrate and fixing it to the opposite substrate using an adhesive is disclosed. However, in such a technique, the adhesive must be located only on the column surface or wall surface, but the technique of micro-stamping the adhesive on the column surface or wall surface has high process difficulty; the control of the adhesive thickness and area is difficult; upon lamination of the upper and lower substrates, there is a high probability that the adhesive will be pushed out; and there is a risk that the adhesive may be contaminated into the alignment film or liquid crystal.

DISCLOSURE

Technical Problem

In order that the cell gap of the liquid crystal cell is maintained and the attachment force is secured between the upper substrate and the lower substrate, it may be considered that a spacer and an alignment film are formed on the lower substrate and a pressure-sensitive adhesive layer having liquid crystal orientation force and adhesion force is formed on the upper substrate, followed by lamination. However, the outer layer surrounding the sides of the liquid crystal cell has a low storage elastic modulus at a high temperature during the autoclave process for bonding the glass substrate to both sides of the liquid crystal cell, so that strong pressures may be applied to the edge region of the liquid crystal cell adjacent to the outer layer. As a result, in the edge region of the liquid crystal cell, uneven pressures are concentrated on a local region, which may cause phenomena of cell gap collapse (pressing) and liquid crystal overflow during bonding of the outer substrate.

It is an object of the present application to provide an optical device which can properly maintain a cell gap of a liquid crystal cell, have excellent adhesion between an upper substrate and a lower substrate, and solve the pressing and overflow phenomena of the liquid crystal cell during bonding with an outer substrate.

Technical Solution

Among the physical properties mentioned in this specification, when the measurement temperature affects the result, the relevant physical property is a physical property measured at room temperature, unless otherwise specified. The term room temperature is a natural temperature without warming or cooling, which is usually one temperature in a range of about 10° C. to 30° C. or a temperature of about 23° C. or about 25° C. or so. Also, in this specification, unless otherwise specified, the unit of temperature is ° C. Among the physical properties mentioned in this specification, when the measurement pressure affects the result, the relevant physical property is a physical property measured at normal pressure, unless otherwise specified. The term normal pressure is a natural pressure without pressurization or depressurization, which refers to about 1 atm or so as the normal pressure.

The present application relates to an optical device. FIG. 1 exemplarily shows the optical device of the present application. The upper structure of FIG. 1 exemplarily shows the top surface of the optical device, and the lower structure of FIG. 1 exemplarily shows the side surfaces of the optical device. The top surface and side surfaces of the optical device are based on a state where the second outer substrate of the optical device is placed in contact with the floor. Therefore, the top surface of the optical device may mean a structure viewed from the side of the first outer substrate.

As shown in FIG. 1, the optical device of the present application may sequentially comprise a first outer substrate (101), a liquid crystal cell (200) and a second outer substrate (102). The liquid crystal cell may comprise an upper substrate, a lower substrate, and a liquid crystal layer between the upper substrate and the lower substrate. The upper substrate may comprise a first base layer and a pressure-sensitive adhesive layer. The lower substrate may comprise a second base layer and spacers. The liquid crystal layer may comprise a liquid crystal compound. The first base layer may be disposed closer to the first outer substrate than the second base layer, and the second base layer may be disposed closer to the second outer substrate than the first base layer.

The optical device may comprise a first intermediate layer (301) positioned between the liquid crystal cell (200) and the first outer substrate (101). The optical device may comprise a second intermediate layer (302) positioned between the liquid crystal cell (200) and the second outer substrate (102).

The optical device may comprise at least one or more regions satisfying Equation 1 below. Through this, in the process of bonding the liquid crystal cell and the outer substrate, the local pressure applied to the edge portion of the liquid crystal cell can be dispersed, and pressing and overflow phenomena of the liquid crystal cell can be solved.

$$20\ \text{mm} \leq L_1 - L_2 \quad \text{[Equation 1]}$$

In Equation 1, $L_1$ is the distance between the outer portion of the first outer substrate and the outer portion of the liquid crystal cell, or the distance between the outer portion of the second outer substrate and the outer portion of the liquid crystal cell, and $L_2$ is the distance between the outer portion of the first outer substrate and the outer portion of the first intermediate layer, or the distance between the outer portion of the second outer substrate and the outer portion of the second intermediate layer.

In one example, $L_1$ may be the distance between the outer portion of the first outer substrate and the outer portion of the liquid crystal cell, and $L_2$ may be the distance between the outer portion of the first outer substrate and the outer portion of the first intermediate layer. In one example, $L_1$ may be the distance between the outer portion of the second outer substrate and the outer portion of the liquid crystal cell, and $L_2$ may be the distance between the outer portion of the second outer substrate and the outer portion of the second intermediate layer. In one example, the difference ($D_1=L_1-L_2$ for first outer substrate) between the distance ($L_1$) between the outer portion of the first outer substrate and the outer portion of the liquid crystal cell and the distance ($L_2$) between the outer portion of the first outer substrate and the outer portion of the first intermediate layer may be 20 mm or more, and at the same time, the difference ($D_2=L_1-L_2$ for second outer substrate) between the distance ($L_1$) between the outer portion of the second outer substrate and the outer portion of the liquid crystal cell and the distance ($L_2$) between the outer portion of the second outer substrate and the outer portion of the second intermediate layer may be 20 mm or more. The distance between the outer portion of the first outer substrate and the outer portion of the liquid crystal cell may mean the distance between the first outer substrate and the outer portion of the first base layer of the liquid crystal cell. The distance between the outer portion of the second outer substrate and the outer portion of the liquid crystal cell may mean the distance between the second outer substrate and the outer portion of the second base layer of the liquid crystal cell.

In Equation 1, $L_1$ may mean a minimum straight-line distance between the outer portion of the first outer substrate and the outer portion of the liquid crystal cell or a minimum straight-line distance between the outer portion of the second outer substrate and the outer portion of the liquid crystal cell. Specifically, $L_1$ may mean the shortest distance when any one point on the outer portion of the first outer substrate or the second outer substrate and any one point on the outer portion of the liquid crystal cell are connected in a straight line. In Equation 1, $L_2$ may mean the shortest straight-line distance between the outer portion of the first outer substrate and the outer portion of the first intermediate layer, or the shortest straight-line distance between the outer portion of the second outer substrate and the outer portion of the second intermediate layer. Specifically, $L_2$ may mean the shortest distance when any one point on the outer portion of the first outer substrate and any one point on the outer portion of the first intermediate layer are connected in a straight line. Alternatively, $L_2$ may mean the shortest distance when any one point on the outer portion of the second outer substrate and any one point of the outer portion of the second intermediate layer are connected in a straight line.

In one example, the first outer substrate, the second outer substrate, the liquid crystal cell, the first intermediate layer, and the second intermediate layer may all be laminated such that length directions are parallel to each other and width directions are parallel to each other. The first outer substrate, the second outer substrate, the liquid crystal cell, the first intermediate layer, and the second intermediate layer may each have an approximately quadrangular shape, for example, a rectangular shape, where the length direction may mean a direction parallel to the longest side of the quadrangle, and the width direction may mean a direction parallel to the shortest side of the quadrangle. In this specification, the "parallel" may mean that the directions, axes, or sides to be evaluated form approximately 0 degrees to 10 degrees, 0 degrees to 5 degrees, 0 degrees to 3 degrees, or approximately 0 degrees from each other. In this specification, the rectangle may mean a shape in which the angles of four vertices are approximately 80 degrees to 100 degrees, 85 degrees to 95 degrees, 93 degrees to 91 degrees, or approximately 90 degrees.

In defining $L_1$ and $L_2$ in Equation 1, the "straight line" may be parallel to the length direction (x axis in FIG. 1), or parallel to the width direction (y axis in FIG. 1). In one example, when the length direction of the optical device lies at the top and bottom and the width direction lies at the left and right sides while observing the optical device in the normal direction, and when the regions satisfying Equation 1 are present in the left and right sides of the liquid crystal cell, the straight line may be parallel to the length direction of the optical device. In another example, when observing as above, and when the regions satisfying Equation 1 are present in the top and bottom of the liquid crystal cell, the straight line may be parallel to the width direction of the optical device. In this specification, the normal direction of the optical device may mean the laminating direction of each component of the optical device or the thickness direction of the optical device, or may mean a direction perpendicular to the plane of the first outer substrate, the second outer substrate, the liquid crystal cell, the first intermediate layer and/or the second intermediate layer.

In the optical device, the region satisfying Equation 1 may exist over one side of the liquid crystal cell. When there is one region satisfying Equation 1, all regions across at least one side of the liquid crystal cell may satisfy Equation 1. For example, when there are n regions satisfying Equation 1, all regions across at least n sides of a liquid crystal cell may satisfy Equation 1.

In one example, when the optical device includes one region satisfying Equation 1, the region may be present in any one region of the left side, right side, upper side and lower side of the liquid crystal cell. At this time, the regions on the remaining three sides may not satisfy Equation 1. In another example, when the optical device includes two or more regions satisfying Equation 1, for example, when it includes two regions, the regions may be present in both sides, for example, the left and right sides, of the liquid crystal cell, respectively, or may be present in the upper and lower sides, respectively. At this time, the regions on the other two sides may not satisfy Equation 1. FIG. 1 exemplarily shows a case where the regions are present in the left and right sides of the liquid crystal cell (D1 and D2). According to one example of the present application, the regions satisfying Equation 1 may be present in the left and right sides of the liquid crystal cell, respectively. In another example, when the optical device includes three or more regions satisfying Equation 1, the respective regions may be connected to each other.

When the optical device also comprises regions that do not satisfy Equation 1, the $L_1-L_2$ values of Equation 1 in the regions may each be less than 20 mm, less than 10 mm, less than 5 mm, less than 1 mm, or approximately 0 mm. In one example, any distance between the outer portion of the liquid crystal cell and the outer portion of the first intermediate layer and/or the second intermediate layer may not substantially exist in the regions.

The distance defined by $L_1-L_2$ in Equation 1 may be 20 mm or more, 25 mm or more, or 30 mm or more. The upper limit of the distance defined by $L_1-L_2$ in Equation 1 may be, for example, 200 mm or less, 180 mm or less, 160 mm or less, 140 mm or less, 120 mm or less, 100 mm or less, 80 mm or less, 60 mm or less, or 40 mm or less. If the distance of $L_1-L_2$ is excessively long, the active area driven liquid crystals may be significantly reduced, so that it may be appropriate that the upper limit is within the above range.

Each of $L_1$ and $L_2$ may be appropriately selected according to the shape or design of a product to be applied within a range without impairing the purpose of the present application.

When observing the optical device in the normal direction, the distance between the outer portion of the first outer substrate and the outer portion of the second outer substrate may be less than 5 mm, less than 3 mm, less than 1 mm, or approximately 0 mm. The distance may mean the shortest distance when any one point on the outer portion of the first outer substrate and any one point on the outer portion of the second outer substrate are connected in a straight line. At this instance, the distance may be less than 5 mm, less than 3 mm, less than 1 mm, or approximately 0 mm in all the outer portions of the first outer substrate and the second outer substrate. That is, when observing the optical device in the normal direction, the region of the first outer substrate and the region of the second outer substrate may substantially coincide.

When observing the optical device in the normal direction, the distance between the outer portion of the first intermediate layer and the outer portion of the second intermediate layer may be less than 5 mm, less than 3 mm, less than 1 mm, or approximately 0 mm. The distance may mean the shortest distance when any one point of the outer portion of the first intermediate layer and any one point of the outer portion of the second intermediate layer are connected in a straight line. At this instance, the distance may be less than 5 mm, less than 3 mm, less than 1 mm, or approximately 0 mm in all the outer portions of the first intermediate layer and the second intermediate layer. That is, when observing the optical device in the normal direction, the region of the first intermediate layer and the region of the second intermediate layer may substantially coincide.

In one example, the area (unit: $mm^2$) of the first intermediate layer and/or the area (unit: $mm^2$) of the second intermediate layer may be larger than the area (unit: $mm^2$) of the liquid crystal cell. The area of the liquid crystal cell may be the area of the first base layer and/or the second base layer. In one example, when observing the optical device in the normal direction, the region of the liquid crystal cell may be included in the region of the first intermediate layer and/or the region of the second intermediate layer. Through this, it is possible to disperse the local pressure applied to the edge portion of the liquid crystal cell during the bonding process with the outer substrate, and it is possible to solve pressing and overflow phenomena of the liquid crystal cell.

In one example, when observing the optical device in the normal direction, the first intermediate layer may be located at the center of the first outer substrate, and the liquid crystal cell (or the first base layer) may be located at the center of the first intermediate layer. Also, when observing the optical device in the normal direction, the second intermediate layer may be located at the center of the second outer substrate, and the liquid crystal cell (or the second base layer) may be located at the center of the second intermediate layer.

In one example, the width×height area of the liquid crystal cell may be appropriately selected according to the purpose of the optical device. For example, the width length of the liquid crystal cell may be within a range of 100 mm to 5000 mm, and the height length may be within a range of 100 mm to 5000 mm.

Each of the first intermediate layer and the second intermediate layer may be a polarizer or a polymer film.

In one example, each of the first intermediate layer and the second intermediate layer may be a polarizer. As the first intermediate layer, the polarizer may be referred to as a first polarizer, and as the second intermediate layer, the polarizer may be referred to as a second polarizer.

In this specification, the term polarizer means a film, sheet or element having a polarization function. The polarizer is a functional element capable of extracting light vibrating in one direction from incident light vibrating in multiple directions.

The first polarizer and the second polarizer may each be an absorption type polarizer or a reflection type polarizer. In this specification, the absorption type polarizer means an element showing selective transmission and absorption characteristics with respect to incident light. The absorption type polarizer may transmit, for example, light vibrating in any one direction from incident light vibrating in multiple directions, and may absorb light vibrating in the other directions. In this specification, the reflection type polarizer means an element showing selective transmission and reflection characteristics with respect to incident light. The reflection type polarizer may transmit, for example, light vibrating in any one direction from incident light vibrating in multiple directions, and may reflect light vibrating in the other directions. According to one example of the present application, the polarizer may be an absorption type polarizer.

Each of the first polarizer and the second polarizer may be a linear polarizer. In this specification, the linear polarizer means a case in which the selectively transmitted light is linearly polarized light vibrating in any one direction, and the selectively absorbed or reflected light is linearly polarized light vibrating in a direction perpendicular to the vibration direction of the linearly polarized light. In the case of the absorption type linear polarizer, the light transmission axis and the light absorption axis may be perpendicular to each other. In the case of the reflection type linear polarizer, the light transmission axis and the light reflection axis may be perpendicular to each other.

In one example, the first polarizer and the second polarizer may each be a stretched polymer film dyed with iodine or an anisotropic dye. As the stretched polymer film, a PVA (poly(vinyl alcohol)) stretched film may be exemplified. In another example, each of the first polarizer and the second polarizer may be a guest-host type polarizer in which a liquid crystal polymerized in an oriented state is a host, and an anisotropic dye arranged according to the orientation of the liquid crystal is a guest. In another example, the first polarizer and the second polarizer may each be a thermotropic liquid crystal film or a lyotropic liquid crystal film.

A protective film, an antireflection film, a retardation film, a pressure-sensitive adhesive layer, an adhesive layer, a surface treatment layer, and the like may be additionally formed on one side or both sides of the first polarizer and the second polarizer, respectively. As a material of the protective film, for example, a thermoplastic resin having excellent transparency, mechanical strength, thermal stability, moisture barrier properties, or isotropic properties, and the like may be used. An example of such a resin may be exemplified by cellulose resins such as TAC (triacetyl cellulose), polyester resins, polyethersulfone resins, polysulfone resins, polycarbonate resins, polyamide resins, polyimide resins, polyolefin resins, (meth)acrylic resins, cyclic polyolefin resins such as norbornene resins, polyarylate resins, polystyrene resins, polyvinyl alcohol resins, or mixtures thereof, and the like. The retardation film may be, for example, a ¼ wave plate or a ½ wave plate. The ¼ wave plate may have an in-plane retardation value for light having a wavelength of 550 nm in a range of about 100 nm to 180 nm, 100 nm, or 150 nm. The ½ wave plate may have an in-plane retardation value for light having a wavelength of 550 nm in a range of about 200 nm to 300 nm or 250 nm to 300 nm. The retardation film may be, for example, a stretched polymer film or a liquid crystal polymerization film.

The first polarizer and the second polarizer may each have transmittance for light with a wavelength of 550 nm in a range of 40% to 50%. The transmittance may mean single transmittance of the polarizer for light with a wavelength of 550 nm. The single transmittance of the polarizer may be measured using, for example, a spectrometer (V7100, manufactured by Jasco). For example, after air is set as the base line in a state where the polarizer sample (without upper and lower protective films) is mounted on the device, and each transmittance is measured in a state where the axis of the polarizer sample is aligned vertically and horizontally with the axis of the reference polarizer, the single transmittance can be calculated.

In the case of using a polarizer as each of the first and second intermediate layers, the thickness of the polarizer may be within a range of 1 μm to 500 μm. Specifically, the thickness of the polarizer may be 30 μm or more, 50 μm or more, 70 μm or more, or 90 μm or more, and may be 400 μm or less, 300 μm or less, 200 μm or less, or 100 μm or less.

In one example, the first intermediate layer and the second intermediate layer may each be a polymer film. The polymer film may not have a polarizing function. Therefore, the polymer film may not contain iodine, anisotropic dyes or dichroic dyes. In one example, the first intermediate layer and the second intermediate layer may each have a single-layer structure of a polymer film or a laminate of polymer films. The laminate of the polymer films may mean a structure in which two or more polymer films are laminated. In one example, the polymer film may comprise one or more selected from the group consisting of a TAC (triacetyl cellulose) film, a DAC (diacetyl cellulose) film, a COP (cyclo olefin copolymer) film, a PA (polyacrylate) film, a PMMA (poly(methyl methacrylate)) film, a PC (polycarbonate) film, a PE (polyethylene) film, a PP (polypropylene) film, a PVA (polyvinyl alcohol) film, a PI (polyimide) film, a PSF (polysulfone) film, a PPS (polyphenylsulfone) film, a PES (polyethersulfone) film, a PEEK (polyetheretherketon) film, a PEI (polyetherimide) film, a PEN (polyethylenenaphthatlate) film, and a PET (polyethyleneterephtalate) film.

In the case of using a polymer film as each of the first and second intermediate layers, the thickness of the polymer film may be within a range of 10 μm to 1,000 μm. The polymer film may have a thickness of 30 μm or more, 50 μm or more, 70 μm or more, 90 μm or more, or 110 μm or more, and may be 1,000 μm or less, 800 μm or less, 600 μm or less, 400 μm or less, or 200 μm or less. When each of the first and second intermediate layers is a polymer film laminate, the thickness of the entire laminate may be within the above range.

The first outer substrate and the second outer substrate may each independently be an inorganic substrate or a polymer substrate. The inorganic substrate is not particularly limited, and a well-known inorganic substrate may be used. In one example, a glass substrate having excellent light transmittance may be used as the inorganic substrate. As an example of the glass substrate, a soda lime glass substrate, a general tempered glass substrate, a borosilicate glass substrate or an alkali-free glass substrate, and the like may be used, without being limited thereto. As the polymer substrate, a cellulose film such as TAC (triacetyl cellulose) or DAC (diacetyl cellulose); a COP (cyclo olefin copolymer) film such as norbornene derivatives; an acrylic film such as PAR (polyacrylate) or PMMA (poly(methyl methacrylate); a PC (polycarbonate) film; a polyolefin film such as PE (polyethylene) or PP (polypropylene); a PVA (polyvinyl alcohol) film; a PI (polyimide) film; a sulfone-based film such as a PSF (polysulfone) film, a PPS (polyphenylsulfone) film or a PES (polyethersulfone) film; a PEEK (polyetheretherketon) film; a PEI (polyetherimide) film; a polyester-based film such as a PEN (polyethylenenaphthatlate) film or a PET (polyethyleneterephtalate) film; or a fluororesin film, and the like may be used, without being limited thereto. In each of the first outer substrate and the second outer substrate, a coating layer of: gold; silver; or a silicon compound such as silicon dioxide or silicon monoxide, or a functional layer such as an antireflection layer may also be present as needed.

In one example, the first outer substrate and/or the second outer substrate may be a glass substrate. The area of the first outer substrate and/or the second outer substrate may be larger than the area of the first intermediate layer and/or the second intermediate layer.

Each of the first outer substrate and the second outer substrate may have a thickness of about 0.3 mm or more. In another example, the thickness may be about 0.5 mm or more, 1 mm or more, 1.5 mm or more, or about 2 mm or more, and may also be about 10 mm or less, 9 mm or less, 8 mm or less, 7 mm or less, 6 mm or less, 5 mm or less, 4 mm or less, or about 3 mm or less.

The first outer substrate and the second outer substrate may be a flat substrate or may be a substrate having a curved surface shape. For example, the first outer substrate and the second outer substrate may be simultaneously flat substrates, simultaneously have a curved surface shape, or any one may be a flat substrate and the other may be a substrate having a curved surface shape. In addition, here, in the case of having the curved surface shape at the same time, the respective curvatures or curvature radii may be the same or different. In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

The width and height lengths of the first outer substrate and/or the second outer substrate may be appropriately selected in consideration of an applied optical device. In one example, the width length of the first outer substrate and/or the second outer substrate may be larger than the width length of the liquid crystal cell by 50 mm or more, 100 mm or more, 150 mm or more, or 180 mm or more. In one example, the height length of the first outer substrate and/or the second outer substrate may be larger than the height length of the liquid crystal cell by 50 mm or more, 100 mm or more, 150 mm or more, or 180 mm or more. The difference between the width length of the first outer substrate and/or the second outer substrate and the width length of the liquid crystal cell may be, for example, 5,000 mm or less, 4,000 mm or less, 3,000 mm or less, 2,000 mm or less, 1,000 mm or less, or 500 mm or less. The difference between the height length of the first outer substrate and/or the second outer substrate and the height length of the liquid crystal cell may be, for example, 5,000 mm or less, 4,000 mm or less, 3,000 mm or less, 2,000 mm or less, 1,000 mm or less, or 500 mm or less.

In one example, the optical device may satisfy Equation 2 below. Through this, it is possible to disperse the local pressure applied to the edge portion of the liquid crystal cell during the bonding process with the outer substrate, and it may be advantageous to solve the pressing and overflow phenomena of the liquid crystal cell.

$$A1 < A2 < A3 \quad \text{[Equation 3]}$$

In Equation 2, A1 is the area (unit: $mm^2$) of the liquid crystal cell, A2 is the area (unit: $mm^2$) of the first intermediate layer and/or the second intermediate layer, and A3 is the area (unit: $mm^2$) of the first outer substrate and/or the second outer substrate.

The optical device may further comprise at least one adhesive layer positioned between the first outer substrate and the liquid crystal cell, and between the second outer substrate and the liquid crystal cell.

In one example, the optical device may further comprise a first adhesive layer (401) between the first outer substrate (101) and the first intermediate layer (301), a second adhesive layer (402) between the first intermediate layer (301) and the liquid crystal cell (200), a third adhesive layer (403) between the liquid crystal cell (200) and the second intermediate layer (302), and a fourth adhesive layer (404) between the second intermediate layer (302) and the second outer substrate (102). One surface of the first adhesive layer may directly contact the first outer substrate, and the other surface may directly contact the first intermediate layer. One surface of the second adhesive layer may directly contact the first intermediate layer, and the other surface may directly contact the liquid crystal cell. One surface of the third adhesive layer may directly contact the liquid crystal cell, and the other surface may directly contact the second intermediate layer. One surface of the fourth adhesive layer may directly contact the second intermediate layer, and the other surface may directly contact the second outer substrate. In this specification, the matter that A directly contacts B may mean a state where A and B are in direct contact without any intermediate between A and B.

When observing the optical device in the normal direction, the region of the first intermediate layer may be included in the region of the first outer substrate, and the region of the second intermediate layer may be included in the region of the second outer substrate. Also, when observing the optical device in the normal direction, the regions of the first outer substrate and the second outer substrate may substantially coincide. In addition, when observing the optical device in the normal direction, the region of the first intermediate layer and the region of the second intermediate layer may substantially coincide. Furthermore, the area of the first adhesive layer, the second adhesive layer, the third adhesive layer and/or the fourth adhesive layer may be substantially the same as the area of the first outer substrate and/or the second outer substrate.

In one example, the storage elastic moduli of the first adhesive layer, the second adhesive layer, the third adhesive layer and/or the fourth adhesive layer may each be higher than the storage elastic modulus of the pressure-sensitive adhesive layer included in the liquid crystal cell. In addition, the loss elastic moduli of the first adhesive layer, the second adhesive layer, the third adhesive layer and/or the fourth adhesive layer may each be higher than the loss elastic modulus of the pressure-sensitive adhesive layer included in the liquid crystal cell. When the storage elastic moduli or loss elastic moduli of the first adhesive layer, the second adhesive layer, the third adhesive layer and/or the fourth adhesive layer are higher than the storage elastic modulus or loss elastic modulus of the pressure-sensitive adhesive layer, it may be advantageous to reduce appearance defects even under durability conditions.

In one example, the first adhesive layer, the second adhesive layer, the third adhesive layer and/or the fourth adhesive layer may also have a storage elastic modulus at a temperature of 25° C. and a frequency of 1 Hz in a range of 1 MPa to 100 MPa. The storage elastic modulus may be specifically, 3 MPa or more, and may be 80 MPa or less, 60 MPa or less, 40 MPa or less, 20 MPa or less, or 10 MPa or less. In one example, the first adhesive layer, the second adhesive layer, the third adhesive layer and/or the fourth adhesive layer may each have a loss elastic modulus at a temperature of 25° C. and a frequency of 1 Hz in a range of 1 MPa to 100 MPa. The loss elastic modulus may be, specifically, 1 MPa or more, and may be 80 MPa or less, 60 MPa or less, 40 MPa or less, 20 MPa or less, or 10 MPa or less. The storage elastic modulus of the first adhesive layer, the second adhesive layer, the third adhesive layer and/or the fourth adhesive layer may each have a higher value than the loss elastic modulus.

As one example, the first adhesive layer, the second adhesive layer, the third adhesive layer and/or the fourth adhesive layer may have Young's modulus (E) in a range of 0.1 MPa to 100 MPa. As another example, the Young's modulus (E) of the first adhesive layer, the second adhesive layer, the third adhesive layer and/or the fourth adhesive layer may be 0.2 MPa or more, 0.4 MPa or more, 0.6 MPa or more, 0.8 MPa or more, 1 MPa or more, 5 MPa or more, or about 10 MPa or more, and may be about 95 MPa or less, 80 MPa or less, 75 MPa or less, 70 MPa or less, 65 MPa or less, 60 MPa or less, 55 MPa or less, or about 50 MPa or less. The Young's modulus (E), for example, can be measured in the manner specified in ASTM D882, and can be measured using the equipment that can cut the film in the form provided by the relevant standard and measure the stress-strain curve (can measure the force and length simultaneously), for example, a UTM (universal testing machine). When the Young's moduli of the adhesive layers included in the optical device are within the above range, it may be more advantageous to ensure excellent durability of the optical device. When the adhesive layer is a laminate of at least two or more sub-adhesive layers, each of the sub-adhesive layers may satisfy the above Young's modulus range.

As one example, the first adhesive layer, the second adhesive layer, the third adhesive layer and/or the fourth adhesive layer may each have a coefficient of thermal expansion of 2,000 ppm/K or less. In another example, the coefficient of thermal expansion may be about 1,900 ppm/K or less, 1,700 ppm/K or less, 1,600 ppm/K or less, or about 1,500 ppm/K or less, or may be about 10 ppm/K or more, 20 ppm/K or more, 30 ppm/K or more, 40 ppm/K or more, 50 ppm/K or more, 60 ppm/K or more, 70 ppm/K or more, 80 ppm/K or more, 90 ppm/K or more, 100 ppm/K or more, 200 ppm/K or more, 300 ppm/K or more, 400 ppm/K or more, 500 ppm/K or more, 600 ppm/K or more, 700 ppm/K or more, or about 800 ppm/K or more. The coefficient of thermal expansion of the adhesive layer can be measured, for example, according to the regulations of ASTM D696, where the coefficient of thermal expansion can be calculated by cutting it in the form provided by the relevant standard, and measuring the change in length per unit temperature, and can be measured by a known method such as the TMA (thermo-mechanic analysis). When the coefficients of thermal expansion of the adhesive layers included in the optical device are within the above range, it may be more advantageous to ensure excellent durability of the optical device. When the adhesive layer is a laminate of at least two or more sub-adhesive layers, each sub-adhesive layer may satisfy the range of the thermal expansion coefficient.

The first adhesive layer, the second adhesive layer, the third adhesive layer and/or the fourth adhesive layer may each be a thermoplastic polyurethane (TPU) adhesive layer, a polyamide adhesive layer, a polyester adhesive layer, an EVA (ethylene vinyl acetate) adhesive layer, an acrylic adhesive layer, a silicone adhesive layer or a polyolefin adhesive layer. According to one example of the present application, the first adhesive layer, the second adhesive layer, the third adhesive layer and the fourth adhesive layer may each be a thermoplastic polyurethane adhesive layer.

As one example, the sum of the total thicknesses of the adhesive layers included in the optical device may be 200 μm or more. The sum of the total thicknesses of the adhesive layers may mean the total sum of thicknesses of all adhesive layers included in the optical device, for example, the first, second, third, and fourth adhesive layers. When the total thickness of the adhesive layers is within the above range, it may be advantageous to secure structural stability and uniform appearance characteristics of the optical device by minimizing defects in the bonding process of the outer substrate. The sum of the total thicknesses of the adhesive layers may be, specifically, 1,500 μm or more, about 1,650 μm or more, 1,700 μm or more, 1,750 μm or more, 1,800 μm or more, 1,850 μm or more, 1,900 μm or more, 1,950 μm or more, 2,000 μm or more, 2,100 μm or more, 2,150 μm or more, or about 2,200 μm or more. The sum of the total thicknesses of the adhesive layers may be, for example, about 6,000 μm or less, 5,900 μm or less, 5,800 μm or less, 5,700 μm or less, 5,600 μm or less, 5,500 μm or less, 5,400 μm or less, 5,300 μm or less, 5,200 μm or less, 5,100 μm or less, or about 5,000 μm or less. If the total thickness of the adhesive layers is too thick, electro-optical properties such as transmittance characteristics of the optical device may be deteriorated, so that it may be advantageous that the total thickness is within the above range.

Each of the first adhesive layer, the second adhesive layer, the third adhesive layer and/or the fourth adhesive layer may have a single-layer structure of one adhesive layer, or may be a laminate of two or more sub-adhesive layers. The thickness and number of sub adhesive layers may be controlled in consideration of the desired thickness of the intermediate layer. In one example, the thickness of one adhesive layer with a single-layer structure or sub-intermediate layer may be in the range of 100 μm to 500 μm, or the range of 300 μm to 400 μm.

In one example, when the first intermediate layer and the second intermediate layer include the first polarizer and the second polarizer, respectively, the light transmission axis of the first polarizer and the light transmission axis of the second polarizer may be perpendicular to each other. Specifically, the angle formed by the light transmission axis of the first polarizer and the light transmission axis of the second polarizer may be in a range of 80 degrees to 100 degrees or 85 degrees to 95 degrees. At this instance, the thicknesses of the second adhesive layer between the first intermediate layer and the liquid crystal cell and the third adhesive layer between the second intermediate layer and the liquid crystal cell may each be 380 μm or less. When the light transmission axis of the first polarizer and the light transmission axis of the second polarizer are perpendicular to each other, light leakage may occur depending on the separation distance between the first polarizer and the second polarizer, but by setting the thicknesses of the second adhesive layer and the third adhesive layer within the above range, the separation distance between the first polarizer and the second polarizer is minimized, so that it is possible to secure structural safety of the liquid crystal cell while reducing the light leakage. The lower limits of the thicknesses of the second adhesive layer and the third adhesive layer may each be 10 μm or more.

FIG. 2 exemplarily shows a liquid crystal cell. As shown in FIG. 2, the liquid crystal cell may comprise a first base layer (10*a*), a pressure-sensitive adhesive layer (10*c*) formed on the inside of the first base layer, a second base layer (20*a*) disposed opposite to the first base layer (10*a*), spacers (20*c*) formed on the inside of the second base layer (20*a*), and a liquid crystal layer (30) positioned between the first base layer (10*a*) and the second base layer (20*a*).

As the first base layer and the second base layer, for example, an inorganic film such as a glass film, a crystalline or amorphous silicon film or a quartz or ITO (indium tin oxide) film, or a polymer film, and the like may be used, and in terms of implementation of flexible elements, the polymer film may be used.

In one example, each of the first base layer and the second base layer may be a polymer film. As the polymer film, TAC (triacetyl cellulose); COPs (cyclo olefin copolymers) such as norbornene derivatives; PMMA (poly(methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylenenaphthatlate); PET (polyethyleneterephtalate); PI (polyimide); PSF (polysulfone); PAR (polyarylate) or an amorphous fluororesin, and the like may be used, without being limited thereto. In the first base layer and the second base layer, a coating layer of gold, silver or a silicon compound such as silicon dioxide or silicon monoxide, or a functional layer such as an antireflection layer may also be present as needed.

The first base layer and the second base layer may each have a thickness of about 10 μm to about 1,000 μm. As another example, the base layers may each have a thickness of about 20 μm or more, 40 μm or more, 60 μm or more, 80 μm or more, 100 μm or more, 120 μm or more, 140 μm or more, 160 μm or more, or about 180 μm or more, and may be about 900 μm or less, 800 μm or less, 700 μm or less, 600 μm or less, 500 μm or less, or about 400 μm or less. When the thicknesses of the first base layer and the second base layer satisfy the above range, it is possible to reduce appearance defects such as wrinkles at the time of manufacturing an optical device by laminating the liquid crystal cell with outer substrates.

The pressure-sensitive adhesive layer may be present on the inner side surface of the first base layer. In this specification, the "inner side surface" of the constitution included in the liquid crystal cell may mean a surface facing the liquid crystal layer.

In one example, the storage elastic modulus of the pressure-sensitive adhesive layer at a temperature of 25° C. and a frequency of 1 Hz may be in a range of 0.2 MPa to 10 MPa. Specifically, the storage elastic modulus of the pressure-sensitive adhesive layer may be 0.3 MPa or more or 0.5 MPa or more, and may be 8 MPa or less, 6 MPa or less, 4 MPa or less, or 2 MPa or less. In one example, the loss elastic modulus of the pressure-sensitive adhesive layer at a temperature of 25° C. and a frequency of 1 Hz may be in a range of 0.5 MPa to 2 MPa. The loss elastic modulus of the pressure-sensitive adhesive layer may be specifically 0.6 MPa or more, 0.7 MPa or more, or 0.8 MPa or more, and may be 1.8 MPa or less, 1.6 MPa or less, 1.4 MPa or less, or 1.2 MPa or less. If the elastic modulus of the pressure-sensitive adhesive layer inside the liquid crystal cell is too low, it may be difficult to maintain the cell gap of the liquid crystal cell, and if the elastic modulus of the pressure-sensitive adhesive layer inside the liquid crystal cell is too high, it may be difficult to impart a pressure-sensitive adhesive effect, so that it may be advantageous that the elastic modulus may be in the above range. In one example, the storage elastic modulus of the pressure-sensitive adhesive layer may have a lower value than the loss elastic modulus.

The pressure-sensitive adhesive layer may be optically transparent. The pressure-sensitive adhesive layer may have average transmittance of about 80% or more, 85% or more, 90% or more, or 95% or more for the visible light region, for example, a wavelength of 380 nm to 780 nm.

The pressure-sensitive adhesive layer may be a liquid crystal orientational pressure-sensitive adhesive layer. The pressure-sensitive adhesive layer may be, for example, a vertically orientational pressure-sensitive adhesive layer or a horizontally orientational pressure-sensitive adhesive layer. In this specification, the "vertically orientational pressure-sensitive adhesive" may mean a pressure-sensitive adhesive having attachment force capable of boding the upper substrate and the lower substrate while imparting vertical orientation force to the adjacent liquid crystal compound. In this specification, the "horizontally orientational pressure-sensitive adhesive" may mean a pressure-sensitive adhesive having attachment force capable of bonding the upper substrate and the lower substrate while imparting horizontal orientation force to the adjacent liquid crystal compound. The pretilt angle of the adjacent liquid crystal compound with respect to the vertically orientational pressure-sensitive adhesive may be in a range of 80 degrees to 90 degrees, 85 degrees to 90 degrees or about 87 degrees to 90 degrees, and the pretilt angle of the adjacent liquid crystal compound with respect to the horizontally orientational pressure-sensitive adhesive may be in a range of 0 degrees to 10 degrees, 0 degrees to 5 degrees or 0 degrees to 3 degrees.

In this specification, the pretilt angle may mean an angle formed by a director of a liquid crystal compound with respect to a plane horizontal to a liquid crystal orientational pressure-sensitive adhesive or an alignment film in a state where no voltage is applied. In this specification, the director of the liquid crystal compound may mean the optical axis or the slow axis of the liquid crystal layer. Alternatively, the director of the liquid crystal compound may mean a long axis direction when the liquid crystal compound has a rod shape, and may mean an axis parallel to the normal direction of the disk plane when the liquid crystal compound has a discotic shape.

The thickness of the pressure-sensitive adhesive layer may be, for example, in a range of 3 μm to 15 μm. When the thickness of the pressure-sensitive adhesive layer is within the above range, it may be advantageous to minimize defects such as pressing or crowding of the pressure-sensitive adhesive when used in the manufacture of a liquid crystal cell, while securing attachment force between the upper substrate and the lower substrate.

As the pressure-sensitive adhesive layer, various types of pressure-sensitive adhesives known in the industry as a so-called OCA (optically clear adhesive) may be appropriately used. The pressure-sensitive adhesive may be different from an OCR (optically clear resin) type adhesive which is cured after the object to be attached is bonded in that it is cured before the object to be attached is bonded. As the pressure-sensitive adhesive, for example, an acrylic, silicone-based, epoxy-based, or urethane-based pressure-sensitive adhesive may be applied.

The pressure-sensitive adhesive layer may comprise a cured product of a pressure-sensitive adhesive resin. In one example, the pressure-sensitive adhesive layer may comprise a silicone-based pressure-sensitive adhesive. The silicone-based pressure-sensitive adhesive may comprise a cured product of a curable silicone compound as the pressure-sensitive adhesive resin.

The type of the curable silicone compound is not particularly limited, and for example, a heat-curable silicone compound or an ultraviolet-curing silicone compound may be used. The curable silicone compound may be referred to as the pressure-sensitive adhesive resin.

In one example, the curable silicone compound may be an addition-curing silicone compound.

Specifically, the addition-curing silicone compound may be exemplified by (1) an organopolysiloxane containing two or more alkenyl groups in the molecule and (2) an organopolysiloxane containing two or more silicon-bonded hydrogen atoms in the molecule, but is not limited thereto. Such a silicone compound can form a cured product by an addition reaction, for example, in the presence of a catalyst to be described below.

A more specific example of the (1) organopolysiloxane, which can be used in the present application, may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1{}_2SiO_{1/2}$ and a siloxane unit represented by $R^1{}_2R^2SiO_{1/2}$ and a siloxane unit represented by $SiO_{4/2}$, an organopolysiloxane copolymer comprising a siloxane unit represented by $R^1{}_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

A more specific example of the (2) organopolysiloxane, which can be used in the present application, may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1_3SiO_{1/2}$, a siloxane unit represented by $R^1_2HSiO_{1/2}$ and a siloxane unit represented by $SiO_{4/2}$, an organopolysiloxane copolymer comprising a siloxane unit represented by $R^1_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group or a 3,3,3-trifluoropropyl group, and the like. In addition, here, $R^2$ is an alkenyl group, which may be, specifically, a vinyl group, an allyl group, a butenyl group, a pentenyl group, a hexenyl group, or a heptenyl group, and the like.

In one example, when the pressure-sensitive adhesive layer is a vertical orientation pressure-sensitive adhesive layer, the pressure-sensitive adhesive may have a surface energy of 16 mN/m or less. The lower limit of the surface energy may be, for example, 5 mN/m or more. When the pressure-sensitive adhesive layer is a horizontal orientation pressure-sensitive adhesive layer, the surface energy may be greater than 16 mN/m. The upper limit of the surface energy may be, for example, 50 mN/m or less. The surface energy can be measured using a drop shape analyzer (KRUSS' DSA100 product). Specifically, a process that deionized water with a known surface tension is dropped on the surface of the pressure-sensitive adhesive to obtain the contact angle is repeated 5 times, thereby obtaining the average value of the resulting five contact angle values, and equally a process that diiodomethane with a known surface tension is dropped thereon to obtain the contact angle is repeated 5 times, thereby obtaining the average value of the resulting five contact angle values. Then, the surface energy has been obtained by substituting a numerical value (Strom value) for the surface tension of the solvent by the Owens-Wendt-Rabel-Kaelble method using the obtained average values of the contact angles for deionized water and diiodomethane. The surface energy (γsurface) of the sample can be calculated by considering the dispersion force between nonpolar molecules and the interaction force between polar molecules (γsurface=γdispersion+γpolar), where the ratio of the polar term (γpolar) in the surface energy γsurface can be defined as polarity of the surface.

The upper substrate and the lower substrate of the liquid crystal cell may be attached by the pressure-sensitive adhesive layer. Specifically, the pressure-sensitive adhesive layer of the upper substrate and the spacer of the lower substrate may be attached. When the alignment film is formed on the spacer of the lower substrate, the region corresponding to the spacer of the alignment film may be attached to the pressure-sensitive adhesive layer of the upper substrate.

The liquid crystal layer may comprise a liquid crystal compound. As the liquid crystal compound, a liquid crystal compound capable of changing the alignment direction by application of an external action may be used. In this specification, the term "external action" may mean all external factors that may affect the behavior of materials included in the liquid crystal layer, for example, an external voltage, or the like. Therefore, the state without any external action may mean a state without application of an external voltage, or the like.

The type and physical properties of the liquid crystal compound may be appropriately selected in consideration of the purpose of the present application. In one example, the liquid crystal compound may be a nematic liquid crystal or a smectic liquid crystal. The nematic liquid crystal may mean a liquid crystal that rod-shaped liquid crystal molecules are arranged in parallel in the long-axis direction of the liquid crystal molecules although there is no regularity in their positions. The smectic liquid crystal may mean a liquid crystal that rod-shaped liquid crystal molecules are regularly arranged to form a layered structure and are arranged in parallel with regularity in the long axis direction. According to one example of the present application, the liquid crystal compound may be a nematic liquid crystal compound.

As the nematic liquid crystal compound, one having a clearing point of, for example, about 40° C. or more, 50° C. or more, 60° C. or more, 70° C. or more, 80° C. or more, 90° C. or more, 100° C. or more, or about 110° C. or more, or having a phase transition point (that is, a phase transition point to an isotropic phase on a nematic phase) in the above range, can be selected. In one example, the clearing point or phase transition point may be about 160° C. or less, 150° C. or less, or about 140° C. or less.

The liquid crystal compound may be a non-reactive liquid crystal compound. The non-reactive liquid crystal compound may mean a liquid crystal compound having no polymerizable group. The polymerizable group may be exemplified by an acryloyl group, an acryloyloxy group, a methacryloyl group, a methacryloyloxy group, a carboxyl group, a hydroxy group, a vinyl group or an epoxy group, and the like, but is not limited thereto, and a functional group known as the polymerizable group may be included.

The liquid crystal compound may have dielectric constant anisotropy of a positive number or a negative number. The absolute value of the dielectric constant anisotropy of the liquid crystal compound may be appropriately selected in consideration of the purpose of the present application. The term "dielectric constant anisotropy (Δε)" may mean a difference (ε//−ε⊥) between the horizontal dielectric constant (ε//) and the vertical dielectric constant (ε⊥) of the liquid crystal. In this specification, the term horizontal dielectric constant (ε//) means a dielectric constant value measured along the direction of an electric field in a state where a voltage is applied so that the director of the liquid crystal and the direction of the electric field by the applied voltage are substantially horizontal, and the vertical dielectric constant (ε⊥) means a dielectric constant value measured along the direction of an electric field in a state where a voltage is applied so that the director of the liquid crystal and the direction of the electric field by the applied voltage are substantially perpendicular. The dielectric constant anisotropy of the liquid crystal compound may be in a range of 5 to 25.

The refractive index anisotropy (Δn) of the liquid crystal compound may be appropriately selected in consideration of the purpose of the present application. In this specification, the term "refractive index anisotropy" may mean a difference ($n_e-n_o$) between an extraordinary refractive index ($n_e$) and an ordinary refractive index ($n_o$) of a liquid crystal compound. The refractive index anisotropy of the liquid crystal compound may be, for example, 0.01 to 0.3. The refractive index anisotropy may be 0.01 or more, 0.05 or more, or 0.07 or more, and may be 0.3 or less, 0.2 or less, 0.15 or less, or 0.13 or less.

The liquid crystal layer (layer in which a liquid crystal compound is present) may further comprise a dichroic dye. When the liquid crystal layer comprises a dichroic dye, it is less affected by cell gap fluctuations during the bonding process of the outer substrate even if the liquid crystal cell comprises a pressure-sensitive adhesive layer, so that there is an advantage that the thickness of the intermediate layer for securing structural stability and uniformity of quality of the liquid crystal cell can be made relatively thin. In one example, when a polymer film is applied as the first and second intermediate layers, the liquid crystal layer may comprise a dichroic dye.

The dichroic dye may control light transmittance variable properties of the liquid crystal layer. In this specification, the term "dye" may mean a material capable of intensively absorbing and/or deforming light in at least a part of or all the ranges within a visible light region, for example, within a wavelength range of 400 nm to 700 nm, and the term "dichroic dye" may mean a material capable of anisotropic absorption of light in at least a part of or all the ranges of the visible light region.

The liquid crystal layer comprising the liquid crystal compound and the dichroic dye may be a GHLC layer (guest host liquid crystal layer). In this specification, the "GHLC layer (guest host liquid crystal layer)" may mean a functional layer that dichroic dyes are arranged together depending on arrangement of the liquid crystal compound to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

As the dichroic dye, for example, a known dye known to have a property capable of being aligned according to the orientation state of the liquid crystal compound by a so-called guest host effect may be selected and used. An example of such a dichroic dye includes azo dyes, anthraquinone dyes, methine dyes, azomethine dyes, merocyanine dyes, naphthoquinone dyes, tetrazine dyes, phenylene dyes, quarterrylene dyes, benzothiadiazole dyes, diketopyrrolopyrrole dyes, squaraine dyes or pyromethene dyes, and the like, but the dyes applicable in the present application are not limited thereto.

The dichroic ratio of the dichroic dye, that is, a value obtained by dividing the absorption of the polarized light parallel to the long axis direction of the dichroic dye by the absorption of the polarized light parallel to the direction perpendicular to the long axis direction may be 5 or more, 6 or more, or 7 or more. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The content of the dichroic dye in the liquid crystal layer may be appropriately selected in consideration of the purpose of the present application. For example, the content of the dichroic dye in the liquid crystal layer may be 0.2 wt % or more. The content of the dichroic dye may specifically be 0.5 wt % or more, 1 wt % or more, 2 wt % or more, or 3 wt % or more. The upper limit of the content of the dichroic dye may be, for example, 10 wt % or less, 9 wt % or less, 8 wt % or less, 6 wt % or less, or 5 wt % or less. When the content of the dichroic dye in the liquid crystal layer is too small, it may be difficult to express the desired transmittance variable characteristics, and it may be insufficient to reduce the thickness of the intermediate layer for reducing the cell gap variation that may occur during the bonding process of the outer substrate. Meanwhile, when the content of the dichroic dye in the liquid crystal layer is too large, there is a risk of precipitation. Therefore, it may be advantageous that the content of the dichroic dye is within the above range.

The thickness of the liquid crystal layer is not particularly limited, and for example, the thickness of the liquid crystal layer may be about 0.01 μm or more, 0.05 μm or more, 0.1 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 μm or more, or 6 μm or more. The upper limit of the thickness of the liquid crystal layer is not particularly limited, which may generally be about 30 μm or less, 25 μm or less, 20 μm or less, or 15 μm or less. The thickness of the liquid crystal layer may be determined according to the height of the spacer.

The liquid crystal layer may switch between a first orientation state and a second orientation state different from the first orientation state. The switching may be controlled through application of external energy such as a voltage. For example, the liquid crystal layer may be maintained in one of the first and second orientation states in a state where no voltage is applied, and then switched to another orientation state by voltage application.

In one example, the first orientation state may be a twist orientation state. That is, the liquid crystal layer may switch between twist orientation and an orientation state different from the twist orientation through the application of external energy.

In one example, the liquid crystal layer may switch between twist orientation and vertical orientation states. In one example, the liquid crystal layer may be in the vertical orientation state in a state where no voltage is applied, and may be in the twist orientation state in a state where a voltage is applied.

In this specification, the "vertical orientational state" is a state where the director of the liquid crystal compound in the liquid crystal layer is arranged substantially perpendicular to the plane of the liquid crystal layer, where for example, the angle formed by the director of the liquid crystal compound with respect to the plane of the liquid crystal layer may be, for example, in the range of about 80 degrees to 100 degrees or 85 degrees to 95 degrees, or may form approximately about 90 degrees.

In this specification, the "twisted orientational state" may mean a spiral structure in which the directors of the liquid crystal compounds in the liquid crystal layer are twisted along an imaginary spiral axis to form a layer and oriented. The twist orientational state may be implemented in a vertical, horizontal, or oblique orientational state. That is, the vertical twist orientational mode is a state where individual liquid crystal compounds are twisted along a spiral axis in a vertically oriented state to form a layer; the horizontal twist orientational mode is a state where individual liquid crystal compounds are twisted along a spiral axis in a horizontally oriented state to form a layer; and the oblique twist orientational mode is a state where individual liquid crystal compounds are twisted along a spiral axis in an obliquely oriented state to form a layer. According to the present application, the twist orientation state may be a twist orientation state of a horizontal orientation state.

In the twist orientation state, the ratio (d/p) of the thickness (d) to the pitch (p) of the liquid crystal layer may be 20 or less, and the lower limit may be 0.5 or more. When the ratio (d/p) of the thickness (d) to the pitch (p) in the twist orientation state is within the above range, the optical device may exhibit excellent light transmittance variable characteristics even in a state without any polarizer. In general, when the ratio d/p is 0.7 or more and less than 2.5, it may be called an STN (super twisted nematic) mode, and when the ratio d/p is 2.5 or more, it may be called an HTN (highly twisted nematic) driving mode.

The pitch (p) of the liquid crystal layer can be measured by a measurement method using a wedge cell, and specifically, can be measured by a method described in D. Podolskyy et al. Simple method for accurate measurements of the cholesteric pitch using a "stripe-wedge Grandjean-Cano cell (Liquid Crystals, Vol. 35, No. 7, July 2008, 789-791). The ratio (d/p) can be achieved by introducing an appropriate amount of a chiral dopant into the liquid crystal layer.

The liquid crystal layer may further comprise a chiral dopant, When the liquid crystal layer comprises a chiral agent, the twist orientation state may be implemented. The chiral agent (or chiral dopant) that can be included in the light crystal layer can be used without special limitation if it can induce a desired rotation (twisting) without deteriorating the liquid crystallinity, for example, the nematic regularity. The chiral agent for inducing rotation in the liquid crystal compound needs to include at least chirality in the molecular structure. The chiral agent may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral agent may be, for example, a low molecular weight compound having a molecular weight of 1,500 or less. As the chiral agent, commercially available chiral nematic liquid crystals, for example, chiral dopant liquid crystal S-811 commercially available from Merck Co., Ltd., or BASF's LC756 may also be used.

The application ratio of the chiral dopant is selected so that the desired ratio (d/p) can be achieved. In general, the content (wt %) of the chiral dopant may be calculated by an equation of 100/HTP (helical twisting power)×pitch (p) (nm). The HTP represents the strength of the twist of the chiral dopant, where the content of the chiral dopant may be determined in consideration of the desired pitch with reference to the above method.

The upper substrate of the liquid crystal cell may further comprise a first electrode layer (10*b*) between the first base layer (10*a*) and the pressure-sensitive adhesive layer (10*c*). The first electrode layer (10*b*) may contact the inner side surface of the first base layer (10*a*). The pressure-sensitive adhesive layer (10*c*) may contact the inner side surface of the first electrode layer (10*b*). The lower substrate of the liquid crystal cell may further comprise a second electrode layer (20*b*) between the second base layer (20*a*) and the spacers (20*c*). The second electrode layer (20*b*) may contact the inner side surface of the second base layer (20*a*). The spacers (20*c*) may contact the inner side surface of the second electrode layer (20*b*).

The first electrode layer and the second electrode layer may serve to provide application of an external action, for example, an electric field, so that the material included in the liquid crystal layer transmits or blocks incident light. In one example, the first electrode layer and/or the second electrode layer may comprise a conductive polymer, a conductive metal, a conductive nanowire, or a metal oxide such as ITO (indium tin oxide), and the like, but is not limited thereto. The first electrode layer and/or second electrode layer may be formed by, for example, depositing the conductive polymer, the conductive metal, the conductive nanowire, or the metal oxide such as ITO (indium tin oxide).

The lower substrate of the liquid crystal cell may further comprise an alignment film (20*d*). The alignment film (20*d*) may be present on the spacers (20*c*). That is, the top surface part and/or the side surface part of the spacers (20*c*) may contact the alignment film. A lower surface part of the spacers (20*c*) may contact the second electrode layer (20*b*). Since the pressure-sensitive adhesive layer included in the upper substrate may have liquid crystal orientation, the upper substrate may not comprise an alignment film. That is, the alignment film may not be included on the inner side surface of the first electrode layer (10*b*).

In this specification, the combination of the first base layer, the first electrode layer and the pressure-sensitive adhesive layer may be referred to as the upper substrate, and the combination of the second base layer, the second electrode layer, the spacer and the alignment film may be referred to as the lower substrate. In the liquid crystal cell, the upper substrate may not comprise a separate alignment film other than the pressure-sensitive adhesive layer, and the lower substrate may comprise the alignment film.

The alignment film and the liquid crystal layer may be in contact with each other. The alignment film may be a vertical alignment film or a horizontal alignment film. In this specification, the "horizontal alignment film" may mean a layer comprising an orientational material that imparts horizontal orientation force to a liquid crystal compound present in an adjacent liquid crystal layer. In this specification, the "vertical alignment film" may mean a layer comprising an orientational material that imparts vertical orientation force to a liquid crystal compound present in an adjacent liquid crystal layer. The adjacent liquid crystal compound may have a pretilt angle with respect to the vertical alignment film in the range of 80 degrees to 90 degrees, 85 degrees to 90 degrees, or about 87 degrees to 90 degrees, and the adjacent liquid crystal compound may have a pretilt angle with respect to the horizontal alignment film in the range of 0 degrees to 10 degrees, 0 degrees to 5 degrees or 0 degrees to 3 degrees. Unlike the pressure-sensitive adhesive layer, the alignment film may not have adhesive force for bonding the upper substrate and the lower substrate. In one example, the alignment film may have peel force close to zero regarding the first base layer in the state of the liquid crystal cell of FIG. 2.

The alignment film may be a rubbing alignment film or a photo-alignment film. The orientation direction of the alignment film may be a rubbing direction in the case of a rubbing alignment film and a direction of polarized light to be irradiated in the case of a photo-alignment film, where such an orientation direction can be confirmed by a detection method using an absorption-type linear polarizer. Specifically, the orientation direction can be confirmed by disposing an absorption-type linear polarizer on one side of the liquid crystal layer in a state where the liquid crystal compound included in the liquid crystal layer is horizontally oriented, and measuring transmittance while rotating the polarizer at 360 degrees. When the side of the liquid crystal layer or the absorption-type linear polarizer is irradiated with light in the above state and simultaneously the luminance (transmittance) is measured from the other side, the transmittance tends to be low, if the absorption axis or transmission axis coincides with the orientation direction of the liquid crystal alignment film, where the orientation direction can be confirmed through simulation reflecting the refractive index anisotropy of the applied liquid crystal compound or the like. A method of confirming the orientation direction according to the mode of the liquid crystal layer is known, and in the present application, the orientation direction of the alignment film can be confirmed by such a known method.

The alignment film may comprise one or more selected from the group consisting of a material known to exhibit orientation ability by rubbing orientation such as a polyimide compound, a poly(vinyl alcohol) compound, a poly(amic acid) compound, a polystyrene compound, a polyamide compound and a polyoxyethylene compound, or a material known to exhibit orientation ability by light irradiation such as a polyimide compound, a polyamic acid compound, a polynorbornene compound, a phenylmaleimide copolymer compound, a polyvinylcinnamate compound, a polyazobenzene compound, a polyethyleneimide compound, a polyvinylalcohol compound, a polyamide compound, a polyethylene compound, a polystyrene compound, a polyphenylenephthalamide compound, a polyester compound, a CMPI (chloromethylated polyimide) compound, a PVCI (polyvinylcinnamate) compound and a polymethyl methacrylate compound, but is not limited thereto.

The spacer (20*c*) may maintain the gap between the upper substrate and the lower substrate. The liquid crystal layer may be present in a region where the spacer does not exist between the upper substrate and the lower substrate.

The spacer may be a patterned spacer. The spacer may have a column shape or a partition wall shape. The partition wall may partition the space between the lower substrate and the upper substrate into two or more spaces. In the region where the spacer does not exist, other films or other layers present in the lower part may be exposed. For example, the second electrode layer may be exposed in a region where the spacer does not exist. The alignment film may cover the spacer and the second electrode layer exposed in the region where the spacer is not present. In the liquid crystal cell in which the upper substrate and the lower substrate are bonded together, the alignment film present on the spacer of the lower substrate and the pressure-sensitive adhesive layer of the upper substrate may be in contact with each other.

The liquid crystal compound and the above-described additives, for example, the dichroic dye, the chiral agent, and the like may be present in the region between the upper substrate and the lower substrate where the spacer does not exist. The shape of the spacer is not particularly limited, which can be applied without limitation to have, for example, a circle, an ellipse, or other polygonal-shaped polyhedrons.

The spacer may comprise a curable resin. The type of the curable resin is not particularly limited, where for example, a thermosetting resin or a photo-curable resin, for example, an ultraviolet curable resin may be used. As the thermosetting resin, for example, a silicone resin, a silicon resin, a fran resin, a polyurethane resin, an epoxy resin, an amino resin, a phenol resin, a urea resin, a polyester resin or a melamine resin, and the like may be used, without being limited thereto. As the ultraviolet curable resin, typically an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like may be used, without being limited thereto.

The spacer may be formed by a patterning process. For example, the spacer may be formed by a photolithography process. The photolithography process may comprise a process of applying a curable resin composition on a base layer or an electrode layer and then irradiating it with ultraviolet rays via a pattern mask. The pattern mask may be patterned into an ultraviolet transmitting region and an ultraviolet blocking region. The photolithography process may further comprise a process of washing the curable resin composition irradiated with ultraviolet rays. The region irradiated with ultraviolet rays is cured, and the region irradiated with no ultraviolet rays remains in a liquid phase, so that it is removed through the washing process, whereby it can be patterned into a partition wall shape. In the photolithography process, a release treatment may be performed on the pattern mask in order to easily separate the resin composition and the pattern mask after ultraviolet irradiation, or a release paper may also be placed between the layer of the resin composition and the pattern mask.

The width (line width), spacing (pitch), height (thickness) and area of the spacer may be appropriately selected within a range without impairing the purpose of the present application. For example, the width (line width) of the spacer may be in a range of 10 μm to 500 μm or in a range of 10 μm to 50 μm. The spacing (pitch) of the spacer may be in a range of 10 μm to 1000 μm or in a range of 100 μm to 1000 μm. The area of the spacer may be about 5% or more and may be 50% or less, relative to 100% of the total area of the second base layer. When the area of the spacer is within the above range, it may be advantageous to ensure excellent electro-optical properties while adequately securing attachment force between the upper substrate and the lower substrate. The height (thickness) of the spacer may range, for example, from 1 μm to 30 μm or from 3 μm to 20 μm.

The optical device may further comprise an outer layer surrounding the side surfaces of the liquid crystal cell. In the optical device, the top area of the liquid crystal cell may be smaller than the top area of the first outer substrate or the second outer substrate. Also, the top area of the liquid crystal cell may be smaller than the top areas of the first to fourth adhesive layers included in the optical device. Also, the top area of the liquid crystal cell may be smaller than the top area of the first to second intermediate layers included in the optical device.

In one example, the liquid crystal cell may be encapsulated by the first to fourth adhesive layers and the outer layer. In the present application, the term encapsulation may mean covering the entire surface of the liquid crystal cell with the adhesive layers and the outer layer. Depending on the desired structure, it is possible to implement the encapsulation structure, for example, by a method of compressing a laminate comprising a first outer substrate, a first adhesive layer, a first polarizer, a second adhesive layer, a liquid crystal cell, a third adhesive layer, a second polarizer, a fourth adhesive layer, and a second outer substrate sequentially, and an outer layer surrounding the side surfaces of the liquid crystal cell in a vacuum state. Durability and weather resistance of the optical device are greatly improved by such an encapsulation structure, and as a result, it can be stably applied to outdoor applications such as sunroofs.

In one example, the optical device may satisfy Equation 3 below. Through this, it may be advantageous to solve problems such as breakage of the outer substrate and remaining air bubbles after autoclaving.

$$0.3\times B1 < B2 < 1.8\times B1 \quad \text{[Equation 3]}$$

In Equation 3, B1 is the thickness (unit: μm) of the liquid crystal cell, and B2 is the thickness (unit: μm) of the outer layer. The thickness (B1) of the liquid crystal cell may mean the sum of the thickness of the first base layer, the thickness of the pressure-sensitive adhesive layer, the thickness of the liquid crystal layer (height of the spacer), and the thickness of the second base layer. That is, when discussing the thickness (B1) of the liquid crystal cell in this specification, the thicknesses of the electrode layer and the alignment film are nanometer levels, so that they can be excluded. In Equation 3, B2 may be 0.5×B1 or more, 0.6×B1 or more, 0.7×B1 or more, 0.8×B1 or more, 0.9×B1 or more, 1.1×B1 or more, and may be 1.5×B1 or less, or 1.3×B1 or less, 1.0×B1 or less, or 0.9×B1 or less.

In one example, the storage elastic modulus of the outer layer at a temperature of 110° C. and a frequency of 1 Hz may be 100,000 Pa or less. The storage elastic modulus of the outer layer at a temperature of 110° C. and a frequency of 1 Hz may be, specifically, 90,000 Pa or less, 80,000 Pa or less, 70,000 Pa or less, or 50,000 Pa or less, and may be 10,000 Pa or more, or 30,000 Pa or more. Since the outer layer surrounding the side surfaces of the liquid crystal cell has a low storage elastic modulus at high temperature during the autoclave process for bonding the outer substrate to both sides of the liquid crystal cell, a strong pressure may be applied to the edge region of the liquid crystal cell adjacent to the outer layer. As a result, in the edge region of the liquid crystal cell, uneven pressures are concentrated on a local region, which may cause phenomena of cell gap collapse (pressing) and liquid crystal overflow during bonding of the outer substrate. According to the present application, the above phenomena can be solved.

The outer layer may comprise, for example, a thermoplastic polyurethane (TPU) adhesive, a polyamide adhesive, a polyester adhesive, an EVA (ethylene vinyl acetate) adhesive, an acrylic adhesive, a silicone adhesive, or a polyolefin adhesive. In one example, the outer layer may be formed of the same material as that of the first to fourth adhesive layers.

The present application also relates to a method for manufacturing an optical device. The manufacturing method of the optical device may comprise steps of preparing a laminate sequentially comprising a first outer substrate, a first adhesive layer, a first polarizer, a second adhesive layer, a liquid crystal cell, a third adhesive layer, a second polarizer, a fourth ahesive later, and a second outer substrate, and an outer layer surrounding the side surfaces of the liquid crystal cell, and performing an autoclave treatment on the laminate. Unless otherwise specified in the manufacturing method of the optical device, the contents described in the optical device may be equally applied.

When the optical device further comprises other elements in addition to the liquid crystal cell and the polarizer, the laminate may further comprise other elements in addition to the liquid crystal cell and the polarizer at a desired location.

The autoclave process may be performed by heating and/or pressurizing the laminate formed after the laminating step.

The conditions of the autoclave process are not particularly limited, and it may be performed under an appropriate temperature and pressure, for example, depending on the type of the applied intermediate layers. The temperature of a typical autoclave process is about 80° C. or more, 90° C. or more, 100° C. or more, and the pressure is 2 atm or more, without being limited thereto. The upper limit of the process temperature may be about 200° C. or less, 190° C. or less, 180° C. or less, or 170° C. or less or so, and the upper limit of the process pressure may be about 10 atm or less, 9 atm or less, 8 atm or less, 7 atm or less, or 6 atm or less or so.

Such an optical device can be used for various applications, and for example, can be used for eyewear such as sunglasses or AR (augmented reality) or VR (virtual reality) eyewear, an outer wall of a building or a sunroof for a vehicle, and the like. In one example, the optical device itself may be a sunroof for a vehicle. For example, in an automobile including an auto body in which at least one opening is formed, the optical device or the sunroof for a vehicle attached to the opening can be mounted and used.

Effects of Invention

The optical device of the present application can properly maintain a cell gap of a liquid crystal cell, have excellent adhesion between an upper substrate and a lower substrate, and solve the pressing and overflow phenomena of the liquid crystal cell during bonding with an outer substrate.

BRIEF DESCRIPTION OF DRAWINGS

FIG. 1 exemplarily shows the optical device of the present application.

FIG. 2 exemplarily shows the liquid crystal cell of the present application.

FIG. 3 is an image obtained by observing pressing and overflow defects of the optical device of Example 1 after bonding.

FIG. 4 is an image obtained by observing pressing and overflow defects of the optical device of Comparative Example 2 after bonding.

MODE FOR INVENTION

Hereinafter, the present application is specifically described through examples, but the scope of the present application is not limited by the following examples.

Example 1

Manufacturing of Liquid Crystal Cell

As a first base layer, a PET film (SK) having a thickness of about 145 μm and a width×height area of 900 mm×600 mm was prepared. A first electrode layer was formed by depositing ITO (indium-tin-oxide) to a thickness of 50 nm on the first base layer. A pressure-sensitive adhesive composition (KR-3700, Shin-Etsu) was coated on the first electrode layer, and then dried at about 150° C. for about 5 minutes to form a pressure-sensitive adhesive layer having a thickness of about 10 μm. The storage elastic modulus of the pressure-sensitive adhesive layer at a temperature of 25° C. and a frequency of 1 Hz was about 754,500 Pa, and the loss elastic modulus at a temperature of 25° C. and a frequency of 1 Hz was about 906,687 Pa. The combination of the first base layer, the first electrode layer and the pressure-sensitive adhesive layer is referred to as an upper substrate.

As a second base layer, a PET film (SK) having a thickness of about 145 μm and a width×height area of 900 mm×600 mm was prepared. A second electrode layer was formed by depositing ITO (indium-tin-oxide) to a thickness of 50 nm on the second base layer. An acrylic resin composition (KAD-03, Minutatec) was coated on the second electrode layer, and then honeycomb spacers were formed by a photolithography method. The regular hexagon (closed island shape) constituting a honeycomb has a pitch of about 350 μm, a height of about 6 μm, and a line width of about 30 μm. A vertical alignment film (Nissan, 5661) was coated to a thickness of about 300 nm on the spacers, and then rubbed in one direction. The combination of the second base layer, the second electrode layer, the spacers, and the vertical alignment film is referred to as a lower substrate.

A liquid crystal composition was coated on the vertical alignment film of the lower substrate to form a liquid crystal layer, and then a liquid crystal cell was prepared by laminating the pressure-sensitive adhesive layer of the upper substrate to face the coated surface of the liquid crystal composition. The liquid crystal composition comprised a liquid crystal compound (JNC, SHN-5011XX) and a chiral dopant (HCCH, S811), and the pitch (p) of the liquid crystal layer was about 20 μm. The liquid crystal cell is an RTN mode liquid crystal cell in an initial vertical orientation state. The width×height area of the liquid crystal cell was 900 mm×600 mm, and the thickness was about 306 μm.

Optical Device Manufacturing

A laminate comprising a first outer substrate, a first adhesive layer, a first intermediate layer, a second adhesive layer, the prepared liquid crystal cell, a third adhesive layer, a second intermediate layer, a fourth adhesive layer, and a second outer substrate sequentially, and comprising an outer layer surrounding the side surfaces of the liquid crystal cell was prepared. At this instance, it was laminated so that the first base layer of the liquid crystal cell was disposed close to the first outer substrate, and the second base layer of the liquid crystal cell was disposed close to the second outer substrate. Compared to the first outer substrate, the second outer substrate was disposed in the gravitational force direction.

As each of the first outer substrate and the second outer substrate, a double-curved glass having a thickness of about 3 mm and an area of width×length=1100 mm×800 mm was used. As each of the first adhesive layer, the second adhesive layer, the third adhesive layer, and the fourth adhesive layer, a TPU layer (Argotec) having a thickness of about 380 μm was used. The storage elastic modulus of the TPU layer (Argotec) at 25° C. and 1 Hz was 3,357,730 Pa, and the loss elastic modulus at 25° C. and 1 Hz was 1,485,510 Pa. As the outer layer, a TPU layer (Argotec) having a thickness of 380 μm was used. The TPU layer of the outer layer had a storage elastic modulus of 3,357,730 Pa at 25° C. and 1 Hz, and a storage elastic modulus of 49,138 Pa at 110° C. and 1 Hz. As each of the first intermediate layer and the second intermediate layer, a polarizer having a thickness of about 95 μm and an area of width×length=960 mm×600 mm was used. A PVA-based stretched film dyed with iodine was used as the polarizer.

An optical device was manufactured by performing an autoclave process on the laminate at a temperature of about 110° C. and a pressure of about 2 atm.

When observing the optical device in the normal direction, the region of the liquid crystal cell was included in the region of the first intermediate layer and the region of the second intermediate layer. Also, when observing the optical device in the normal direction, the region of the first intermediate layer was included in the region of the first outer substrate, and the region of the second intermediate layer was included in the area of the second outer substrate. In addition, when observing the optical device in the normal direction, the regions of the first outer substrate and the second outer substrate substantially coincide with each other. Furthermore, when observing the optical device in the normal direction, the region of the first intermediate layer and the region of the second intermediate layer substantially coincide. Also, in the optical device, the area of the first to fourth adhesive layers is substantially the same as the area of the first outer substrate. In addition, when observing the optical device in the normal direction, the difference (L1−L2) between the distance (L1) between the outer portion of the first outer substrate and the outer portion of the liquid crystal cell, and the distance (L2) between the outer portion of the first outer substrate and the outer portion of the first intermediate layer was 30 mm (distance D1 based on the first outer substrate) from both sides (left and right) of the liquid crystal cell, respectively. Furthermore, when observing the optical device in the normal direction, the difference (L1−L2) between the distance (L1) between the outer portion of the second outer substrate and the outer portion of the liquid crystal cell, and the distance (L2) between the outer portion of the second outer substrate and the outer portion of the second intermediate layer was 30 mm (distance D2 based on the second outer substrate) from both sides (left and right) of the liquid crystal cell, respectively. Here, L1 of the first outer substrate side and L1 of the second outer substrate side were each 100 mm, and L2 of the first outer substrate side and L2 of the second outer substrate side were each 70 mm. In addition, the step difference between the thickness of the outer layer and the thickness of the liquid crystal cell was 74 μm.

Example 2

An optical device was manufactured in the same manner as in Example 1, except that by using a laminate of a TPU layer (Argotec) with a thickness of 380 μm and a TPU layer (Argotec) with a thickness of 150 μm as the outer layer, the step difference between the thickness of the outer layer and the thickness of the liquid crystal layer was changed to 224 μm.

Example 3

An optical device was manufactured in the same manner as in Example 1, except that by using a polarizer having a width length of 950 mm as each of the first intermediate layer and the second intermediate layer, the distance L1−L2 based on the outer portion of the first outer substrate was changed to 25 mm, and the distance based on the second outer substrate L1−L2 was changed to 25 mm. Here, L1 of the first outer substrate side and L1 of the second outer substrate side were each 100 mm, and L2 of the first outer substrate side and L2 of the second outer substrate side were each 75 mm.

Example 4

An optical device was manufactured in the same manner as in Example 1, except that by using a polarizer having a width length of 940 mm as each of the first intermediate layer and the second intermediate layer, the distance L1-L2 based on the outer portion of the first outer substrate was changed to 20 mm, and the distance L1-L2 based on the second outer substrate was changed to 20 mm. Here, L1 of the first outer substrate side and L1 of the second outer substrate side were each 100 mm, and L1-L2 of the first outer substrate side and L2 of the second outer substrate side were each 80 mm.

Example 5

In the manufacturing of a liquid crystal cell, the liquid crystal cell was manufactured in the same manner as in Example 1, except that a PET film (SK) having a width×height area of 560 mm×600 mm was used as the first base layer and the second base layer. The width×height area of the liquid crystal cell was 560 mm×600 mm and the thickness was about 306 μm. The subsequent processes were performed in the same manner as in Example 1 to manufacture an optical device. The distance L1−L2 based on the outer portion of the first outer substrate was 200 mm, and the distance L1−L2 based on the second outer substrate was changed to 200 mm. L1 of the first outer substrate side and L1 of the second outer substrate side were each 270 mm, and L2 of the first outer substrate side and L2 of the second outer substrate side were each 70 mm.

Example 6

A liquid crystal cell was manufactured in the same manner as in Example 1, except that a liquid crystal composition, in which 2 wt % of a dichroic dye (BASF, X12) was added to the liquid crystal composition used in Example 1, was used. In addition, an optical device was manufactured in the same manner as in Example 1, except that by applying a PET film (including UV cut function) having a thickness of about 125 μm and an area of width×length=940 mm×600 mm instead of the polarizer as the first intermediate layer and the second intermediate layer, the distance L1−L2 based on the outer portion of the first outer substrate was changed to 20 mm and the distance L1−L2 based on the second outer substrate was changed to 20 mm. Here, L1 of the first outer substrate side and L1 of the second outer substrate side were each 100 mm, and L2 of the first outer substrate side and L2 of the second outer substrate side were each 80 mm.

Comparative Example 1

An optical device was manufactured in the same manner as in Example 1, except that by using a polarizer having a width length of 930 mm as the first intermediate layer and the second intermediate layer, the distance L1−L2 based on the outer portion of the first outer substrate was changed to 15 mm, and the distance L1−L2 based on the second outer substrate was changed to 15 mm. Here, L1 of the first outer substrate side and L1 of the second outer substrate side were each 100 mm, and L2 of the first outer substrate side and L2 of the second outer substrate side were each 85 mm.

Comparative Example 2

An optical device was manufactured in the same manner as in Example 1, except that by using a polarizer having a width length of 920 mm as the first intermediate layer and the second intermediate layer, the distance L1−L2 based on the outer portion of the first outer substrate was changed to 10 mm, and the distance L1−L2 based on the second outer substrate was changed to 10 mm. Here, L1 of the first outer substrate side and L1 of the second outer substrate side were each 100 mm, and L2 of the first outer substrate side and L2 of the second outer substrate side were each 90 mm.

Comparative Example 3

An optical device was manufactured in the same manner as in Example 1, except that by using a polarizer having a width length of 920 mm as the first intermediate layer and the second intermediate layer, the distance L1−L2 based on the outer portion of the first outer substrate was changed to 10 mm, and the distance L1−L2 based on the second outer substrate was changed to 10 mm, and by using a laminate of a TPU layer (Argotec) with a thickness of 380 μm and a TPU layer (Argotec) with a thickness of 150 μm as the outer layer, the step difference between the thickness of the outer layer and the thickness of the liquid crystal cell was changed to 224 μm. Here, L1 of the first outer substrate side and L1 of the second outer substrate side were each 100 mm, and L2 of the first outer substrate side and L2 of the second outer substrate side were each 90 mm.

Comparative Example 4

An optical device was manufactured in the same manner as in Example 1, except that by using a polarizer having a width length of 920 mm as the first intermediate layer and the second intermediate layer, the distance L1−L2 based on the outer portion of the first outer substrate was changed to 10 mm, and the distance L1−L2 based on the second outer substrate was changed to 10 mm, and by using a laminate laminating two TPU layers (Argotec) with a thickness of 380 μm as the outer layer, the step difference between the thickness of the outer layer and the thickness of the liquid crystal cell was changed to 454 μm. Here, L1 of the first outer substrate side and L1 of the second outer substrate side were each 100 mm, and L2 of the first outer substrate side and L2 of the second outer substrate side were each 90 mm.

Comparative Example 5

An optical device was manufactured in the same manner as in Example 1, except that by using a polarizer having a width length of 900 mm as the first intermediate layer and the second intermediate layer, the distance L1−L2 based on the outer portion of the first outer substrate was changed to 0 mm, and the distance L1−L2 based on the second outer substrate was changed to 0 mm. Here, L1 of the first outer substrate side and L1 of the second outer substrate side were each 100 mm, and L2 of the first outer substrate side and L2 of the second outer substrate side were each 100 mm.

Evaluation Example 1. Evaluation of Pressing and Overflow Defects after Bonding

For the optical devices of Examples 1 to 6 and Comparative Examples 1 to 5, pressing and overflow defects were evaluated after bonding the outer substrate, and the results were described in Table 1. FIG. 3 is an image in which pressing and overflow defects are observed after bonding of the optical device of Example 1, and FIG. 4 is an image in which pressing and overflow defects are observed after bonding of the optical device of Comparative Example 2. As shown in FIG. 4, in Comparative Example 2, uneven pressures were applied to the edge portion, and liquid crystal crowding due to pressing, and overflow defects were observed. Comparative Examples 1 and 3 to 5 also showed results like those of Comparative Example 2. On the other hand, in Example 1, as shown in FIG. 3, the above defects were not observed. Examples 2 to 6 also showed results like those of Example 1.

TABLE 1

| | | Difference (L1 − L2) of distance between the outer portion of the outer substrate and the outer portion of the liquid crystal cell (L1) − distance (L2) between the outer portion of the outer substrate and the outer portion of the intermediate layer (mm) | Thickness step difference between the outer layer and the liquid crystal cell (μm) | Pressing and overflow defects after bonding |
|---|---|---|---|---|
| Example | 1 | 30 | 74 | Good |
| | 2 | 30 | 224 | Good |
| | 3 | 25 | 74 | Good |
| | 4 | 20 | 74 | Good |
| | 5 | 20 | 74 | Good |
| | 6 | 200 | 74 | Good |
| Comparative Example | 1 | 15 | 74 | Bad |
| | 2 | 10 | 74 | Bad |
| | 3 | 10 | 224 | Bad |
| | 4 | 10 | 454 | Bad |
| | 5 | 0 | 74 | Bad |

EXPLANATION OF REFERENCE NUMERALS

101: first outer substrate, 102: second outer substrate, 200: liquid crystal cell, 301: first intermediate layer, 302: second intermediate layer, 401, first adhesive layer: 402: second adhesive layer, 403; third adhesive layer, 404: fourth adhesive layer, 500: outer layer, 10*a*: first base layer, 10*b*: first electrode layer, 10*c*: pressure-sensitive adhesive layer, 20*a*: second base layer, 20*b*: second electrode layer, 20*c*: spacer, 20*d*: alignment film, 30: liquid crystal layer

The invention claimed is:

1. An optical device comprising:

a first outer substrate;

a first intermediate layer;

a liquid crystal cell;

a second intermediate layer; and a second outer substrate, the first outer substrate, first intermediate layer, the liquid crystal cell, the second intermediate layer, and the second outer substrate sequentially arranged, wherein the liquid crystal cell comprises an upper substrate including a first base layer and a pressure-sensitive adhesive layer; a lower substrate including a second base layer and spacers; and a liquid crystal layer including a liquid crystal compound between the upper substrate and the lower substrate, the optical device comprising at least one region satisfying Equation 1 below and satisfying Equation 2 below:

$$20\ \text{mm} \le L_1 - L_2 \quad \text{[Equation 1]}$$

wherein, $L_1$ is a distance between an outer portion of the first outer substrate and an outer portion of the liquid crystal cell, or a distance between an outer portion of the second outer substrate and an outer portion of the liquid crystal cell, and $L_2$ is a distance between an outer portion of the first outer substrate and an outer portion of the first intermediate layer, or a distance between an outer portion of the second outer substrate and an outer portion of the second intermediate layer, $$A1 < A2 < A3 \quad \text{[Equation 2]}$$

wherein, A1 is an area of the liquid crystal cell, A2 is an area of the first intermediate layer and the second intermediate layer, and A3 is an area of the first outer substrate and the second outer substrate.

2. The optical device according to claim 1, wherein a perimeter of the liquid crystal cell is disposed within a perimeter of the first intermediate layer or is disposed within a perimeter of the second intermediate layer when observing the optical device in a direction normal to a major surface of the liquid crystal cell.

3. The optical device according to claim 1, wherein the at least one region is two or more regions satisfying Equation 1 above.

4. The optical device according to claim 1, wherein each of the first intermediate layer and the second intermediate layer is a polarizer or a polymer film.

5. The optical device according to claim 4, wherein each of the first intermediate layer and the second intermediate layer is a polarizer.

6. The optical device according to claim 4, wherein the polymer film comprises one or more selected from the group consisting of: a TAC (triacetyl cellulose) film, a DAC (diacetyl cellulose) film, a COP (cyclo olefin copolymer) film, a PA (polyacrylate) film, a PMMA (poly(methyl methacrylate)) film, a PC (polycarbonate) film, a PE (polyethylene) film, a PP (polypropylene) film, a PVA (polyvinyl alcohol) film, a PI (polyimide) film, a PSF (polysulfone) film, a PPS (polyphenylsulfone) film, a PES (polyethersulfone) film, a PEEK (polyetheretherketone) film, a PEI (polyetherimide) film, a PEN (polyethylenenaphthatlate) film, or a PET (polyethyleneterephthalate) film.

7. The optical device according to claim 1, wherein each of the first outer substrate and the second outer substrate is a glass substrate.

8. The optical device according to claim 1, wherein $L_1$-$L_2$ is 200 mm or less.

9. The optical device according to claim 1, further comprising a first adhesive layer between the first outer substrate and the first intermediate layer, a second adhesive layer between the first intermediate layer and the liquid crystal cell, a third adhesive layer between the liquid crystal cell and the second intermediate layer, and a fourth adhesive layer between the second intermediate layer and the second outer substrate.

10. The optical device according to claim 1, further comprising an outer layer surrounding side surfaces of the liquid crystal cell.

11. The optical device according to claim 10, satisfying Equation 3 below:

$$0.3 \times B1 < B2 < 1.8 \times B1 \quad \text{[Equation 3]}$$

wherein, B1 is a thickness of the liquid crystal cell, and B2 is a thickness of the outer layer.

12. The optical device according to claim 10, wherein the outer layer has a storage elastic modulus of 100,000 Pa or less at a temperature of 110° C. and a frequency of 1 Hz.

13. The optical device according to claim 1, wherein the liquid crystal layer is configured to switch orientation states upon application of a voltage thereto.

14. The optical device according to claim 1, wherein the upper substrate further comprises a first electrode layer between the first base layer and the pressure-sensitive adhesive layer, and the lower substrate further comprises a second electrode layer between the second base layer and the spacers.

15. The optical device according to claim 14, wherein the upper substrate comprises no alignment film, and the lower substrate further comprises an alignment film.

16. An automobile comprising an auto body in which one or more openings are formed; and the optical device of claim 1 mounted in the one or more openings.

* * * * *